United States Patent
Arora et al.

(10) Patent No.: US 11,755,560 B2
(45) Date of Patent: Sep. 12, 2023

(54) CONVERTING A LANGUAGE TYPE OF A QUERY

(71) Applicant: American Express Travel Related Services Company, Inc., New York, NY (US)

(72) Inventors: Shubham Arora, Meerut (IN); Balaji Balaraman, Bangalore (IN); Sandeep Bose, Scottsdale, AZ (US); Arindam Chatterjee, Bangalore (IN); Sastry Durvasula, Phoenix, AZ (US); Manoj Kumar Rana, Bangalore (IN); Nitish Sharma, Bangalore (IN)

(73) Assignee: American Express Travel Related Services Company, Inc., New York, NY (US)

(*) Notice: Subject to any disclaimer, the term of this patent is extended or adjusted under 35 U.S.C. 154(b) by 204 days.

(21) Appl. No.: 16/105,308

(22) Filed: Aug. 20, 2018

(65) Prior Publication Data
US 2019/0034476 A1    Jan. 31, 2019

Related U.S. Application Data

(63) Continuation of application No. 14/971,314, filed on Dec. 16, 2015, now Pat. No. 10,055,444.

(51) Int. Cl.
*G06F 16/182*    (2019.01)
*G06F 16/176*    (2019.01)
(Continued)

(52) U.S. Cl.
CPC ........ *G06F 16/2365* (2019.01); *G06F 16/173* (2019.01); *G06F 16/176* (2019.01);
(Continued)

(58) Field of Classification Search
CPC .............. G06F 16/2365; G06F 16/248; G06F 21/6227; G06F 16/3344; G06F 16/24522;
(Continued)

(56) References Cited

U.S. PATENT DOCUMENTS 6,775,681 B1 * 8/2004 Ballamkonda .... G06F 16/24537
707/999.102
6,820,168 B2   11/2004 Tanaka
(Continued)

OTHER PUBLICATIONS

USPTO; Non-Final Office Action dated Feb. 7, 2018 in U.S. Appl. No. 14/971,314.
(Continued)

*Primary Examiner* — Tamara T Kyle
*Assistant Examiner* — Berhanu Mitiku
(74) *Attorney, Agent, or Firm* — Thomas | Horstemeyer, LLP

(57) ABSTRACT

A system may receive a query configured to access a column in a data table. The data table may be in a flat file in a big data storage format. The system may detect the language type of the query and validate the query against the syntax of the language type. The system may also validate an access permission for data in the data table. The access permission may be stored in a permissions database. The system may generate a temporary table including the column with the temporary table configured to support the language type. The system may execute the query against the temporary table to generate a query result based on the temporary table as though it were the underlying data table. The system may enforce column-level or row-level access permissions by excluding columns or rows from the temporary table.

20 Claims, 4 Drawing Sheets

(51) Int. Cl.
| | | |
|---|---|---|
| *G06F 16/2452* | (2019.01) | |
| *G06F 16/23* | (2019.01) | |
| *G06F 16/248* | (2019.01) | |
| *G06F 21/62* | (2013.01) | |
| *G06F 16/435* | (2019.01) | |
| *G06F 16/17* | (2019.01) | |
| *G06F 16/2457* | (2019.01) | |
| *G06F 16/215* | (2019.01) | |
| *G06F 16/22* | (2019.01) | |

(52) U.S. Cl.
CPC .......... *G06F 16/183* (2019.01); *G06F 16/215* (2019.01); *G06F 16/22* (2019.01); *G06F 16/248* (2019.01); *G06F 16/2457* (2019.01); *G06F 16/24524* (2019.01); *G06F 16/435* (2019.01); *G06F 21/6227* (2013.01)

(58) Field of Classification Search
CPC ............. G06F 16/24534; G06F 16/313; G06F 16/3329; G06F 16/122; G06F 16/11; G06F 16/2457; G06F 16/148; G06F 16/258; G06F 16/183; G06F 16/215; G06F 16/24553; G06F 16/242; G06F 16/2471
See application file for complete search history.

(56) References Cited

U.S. PATENT DOCUMENTS

| | | | |
|---|---|---|---|
| 8,090,402 B1 | 1/2012 | Fujisaki | |
| 8,572,679 B1 | 10/2013 | Wang | |
| 9,092,502 B1 | 7/2015 | Cannaliato | |
| 9,176,966 B2 | 11/2015 | Silverstein | |
| 9,584,517 B1 | 2/2017 | Branchek | |
| 9,785,953 B2 | 10/2017 | Desai | |
| 2002/0023215 A1 | 2/2002 | Wang | |
| 2003/0028529 A1 | 2/2003 | Cheung | |
| 2003/0208562 A1* | 11/2003 | Hauck .................... H04L 67/02 709/219 | |
| 2004/0028227 A1 | 2/2004 | Yu | |
| 2005/0027723 A1 | 2/2005 | Jones | |
| 2005/0049924 A1 | 3/2005 | DeBettencourt | |
| 2005/0144451 A1 | 6/2005 | Voice | |
| 2005/0149761 A1 | 7/2005 | Chiviendacz | |
| 2006/0136570 A1 | 6/2006 | Pandya | |
| 2006/0195449 A1* | 8/2006 | Hunter ................ G06F 21/6227 | |
| 2006/0282864 A1 | 12/2006 | Gupte | |
| 2006/0294354 A1 | 12/2006 | McCall | |
| 2007/0005648 A1 | 1/2007 | Armanino | |
| 2007/0005967 A1 | 1/2007 | Mister | |
| 2007/0045403 A1 | 3/2007 | Slonecker, Jr. | |
| 2007/0064598 A1 | 3/2007 | Nooner | |
| 2007/0157016 A1 | 7/2007 | Dayan | |
| 2008/0162413 A1* | 7/2008 | Kirk .................... G06F 16/2453 | |
| 2008/0229352 A1 | 9/2008 | Pino | |
| 2008/0275951 A1 | 10/2008 | Branson | |
| 2009/0013194 A1 | 1/2009 | Abbas | |
| 2009/0113110 A1 | 4/2009 | Chen | |
| 2009/0136121 A1 | 5/2009 | Nakagaki | |
| 2009/0204613 A1 | 8/2009 | Muroi | |
| 2009/0254463 A1 | 10/2009 | Tomchek | |
| 2009/0319496 A1* | 12/2009 | Warren ............. G06F 16/24535 | |
| 2010/0088338 A1 | 4/2010 | Pavoni, Jr. | |
| 2010/0094838 A1* | 4/2010 | Kozak ................ G06F 16/2443 707/705 | |
| 2010/0198769 A1 | 8/2010 | Gould | |
| 2011/0093925 A1* | 4/2011 | Krishnamoorthy ..... G06F 21/31 711/E12.001 | |
| 2011/0179110 A1* | 7/2011 | Soloway ................ G06Q 10/06 709/203 | |
| 2012/0066107 A1 | 3/2012 | Grajetzki | |
| 2012/0079537 A1 | 3/2012 | Kalidinidi | |
| 2012/0089562 A1 | 4/2012 | Deremigio | |
| 2012/0185925 A1 | 7/2012 | Barkie | |
| 2012/0215684 A1 | 8/2012 | Kidron | |
| 2013/0124413 A1 | 5/2013 | Itwaru | |
| 2013/0187926 A1 | 7/2013 | Silverstein | |
| 2013/0218769 A1 | 8/2013 | Pourfallah | |
| 2013/0268946 A1* | 10/2013 | Langevin .............. G06F 3/1297 719/313 | |
| 2014/0046842 A1 | 2/2014 | Irudayam | |
| 2014/0165133 A1 | 6/2014 | Foley | |
| 2014/0359419 A1* | 12/2014 | Kang .................... G06F 17/245 715/227 | |
| 2015/0026462 A1 | 1/2015 | Ramesh et al. | |
| 2015/0127516 A1 | 5/2015 | Studnitzer | |
| 2015/0150023 A1 | 5/2015 | Johnson | |
| 2015/0161301 A1 | 6/2015 | Begur | |
| 2015/0178532 A1 | 6/2015 | Brule | |
| 2015/0193243 A1 | 7/2015 | Varkhedi | |
| 2015/0193638 A1* | 7/2015 | Cook ...................... G06F 16/13 726/27 | |
| 2015/0227931 A1 | 8/2015 | Genovez | |
| 2015/0256557 A1* | 9/2015 | Wong .................... H04L 63/20 726/6 | |
| 2015/0261881 A1 | 9/2015 | Wensel | |
| 2015/0261948 A1 | 9/2015 | Marra | |
| 2015/0370232 A1 | 12/2015 | Kohn | |
| 2016/0014148 A1 | 1/2016 | Lee | |
| 2016/0020297 A1 | 1/2016 | Kuang | |
| 2016/0070971 A1 | 3/2016 | Nakashima | |
| 2016/0080493 A1 | 3/2016 | Roth | |
| 2016/0088566 A1 | 3/2016 | Stephens | |
| 2016/0092557 A1 | 3/2016 | Stojanovi | |
| 2016/0189119 A1 | 6/2016 | Bowman | |
| 2016/0191433 A1* | 6/2016 | Song ................... H04L 63/105 709/206 | |
| 2016/0203478 A1 | 7/2016 | Gardiner | |
| 2016/0314403 A1 | 10/2016 | Chakraborty | |
| 2017/0017708 A1 | 1/2017 | Fuchs | |
| 2017/0024435 A1* | 1/2017 | Kociubes ............ G06F 16/2453 | |
| 2017/0085445 A1 | 3/2017 | Layman | |
| 2017/0091847 A1 | 3/2017 | Carna | |
| 2017/0116271 A1* | 4/2017 | Ziauddin ........... G06F 16/24539 | |
| 2017/0154067 A1 | 6/2017 | Hazlewood | |
| 2017/0169068 A1 | 6/2017 | Kennedy, Jr. | |
| 2017/0295062 A1 | 10/2017 | Tang | |
| 2017/0364584 A1 | 12/2017 | Ginter | |

OTHER PUBLICATIONS

USPTO; Notice of Allowance dated Jun. 29, 2018 in U.S. Appl. No. 14/971,314.
Non-Final Office Action dated Sep. 21, 2017 in U.S. Appl. No. 14/945,032.
Non-Final Office Action dated Dec. 28, 2017 in U.S. Appl. No. 14/944,849.
Non-Final Office Action dated Feb. 7, 2018 in U.S. Appl. No. 14/972,314.
Non-Final Office Action dated Feb. 14, 2018 in U.S. Appl. No. 14/944,902.
Non-Final Office Action dated Feb. 23, 2018 in U.S. Appl. No. 14/944,898.
Non-Final Office Action dated Apr. 5, 2018 in U.S. Appl. No. 14/944,979.
Final office Action dated Apr. 18, 2018 in U.S. Appl. No. 14/945,032.
Final office Action dated May 30, 2018 in U.S. Appl. No. 14/944,898.
Non-final Offive Action dated Jun. 7, 2018 U.S. Appl. No. 14/994,311.
Non-Final Office Action dated Jun. 12, 2018 in U.S. Appl. No. 15/897,747.
Advisory Action dated Jun. 27, 2018 in U.S. Appl. No. 14/945,032.
Notice of Allowance dated Jun. 29, 2018 in U.S. Appl. No. 14/971,314.
Non-Final Office Action dated Aug. 3, 2018 in U.S. Appl. No. 14/944,898.
Non-Final Office Action dated Aug. 7, 2018 in U.S. Appl. No. 14/945,032.
Non-Final Office Action dated Nov. 28, 2018 in U.S. Appl. No. 15/383,645.

(56) References Cited

OTHER PUBLICATIONS

Final Office Action dated Feb. 21, 2019 in U.S. Appl. No. 14/944,898.

* cited by examiner

CONVERTING A LANGUAGE TYPE OF A QUERY

CROSS REFERENCE TO RELATED APPLICATIONS

This application is a continuation of claims priority to and the benefit of, U.S. Ser. No. 14/971,314 filed Dec. 16, 2015, entitled "SYSTEMS AND METHODS FOR ACCESS CONTROL OVER CHANGING BIG DATA STRUCTURES," the contents of which are incorporated herein by reference in their entirety for all purposes.

FIELD

The present disclosure relates to systems and methods for access control on changing big data structures.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. Once written to file, the file structure of big data storage formats is typically static. That is adding and deleting columns may not be supported without creating a completely new copy of a big data table. Relational databases may support adding and deleting columns. However, traditional relational databases may not be capable of sufficiently handling the size of the tables that big data creates.

As a result, the massive amounts of data in big data sets may be stored in numerous different types of data storage. Sensitive data may be copied and stored in various locations across the different types of data storage for various use cases. Additional copies of tables may be created in response to a column being added or deleted. Consequently, the copies may consume terabytes of storage with duplicative data.

Access control across the various copies and data storage formats may also prove difficult. Permissions for columns may change as columns are added and deleted. Similarly, an individual row may contain sensitive data that demands restricted access. The row level access may not be controlled in typical big data storage formats.

SUMMARY

A system, method, and computer readable medium (collectively, the "system") is disclosed for access control in big data environments. The system may receive a query configured to access a column in a data table. The data table may be in a flat file in a big data storage format. The system may detect the language type of the query and validate the query against the syntax of the language type. The system may also validate an access permission for data in the data table. The access permission may be stored in a permissions database. The system may generate a temporary table including the column with the temporary table configured to support the language type. The system may execute the query against the temporary table to generate a query result based on the temporary table.

In various embodiments, the system may retrieve a personally identifying information (PII) permission from the permissions database that indicates a user executing the query has masked or clear text PII permissions. The system may mask PII data included in the query result based on the PII permissions, in response to the query result containing PII. The system may also retrieve row-level access permissions for a user submitting the query from the permissions database and filter rows from the temporary table, in response to the row-level access permission. The system may check that raw data ingestion is inactive during the query process to maintain atomicity, consistency, isolation, and durability (ACID). The system may further determine the column is unavailable in source data and populate the column in the temporary table with null values.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

Figure 3:
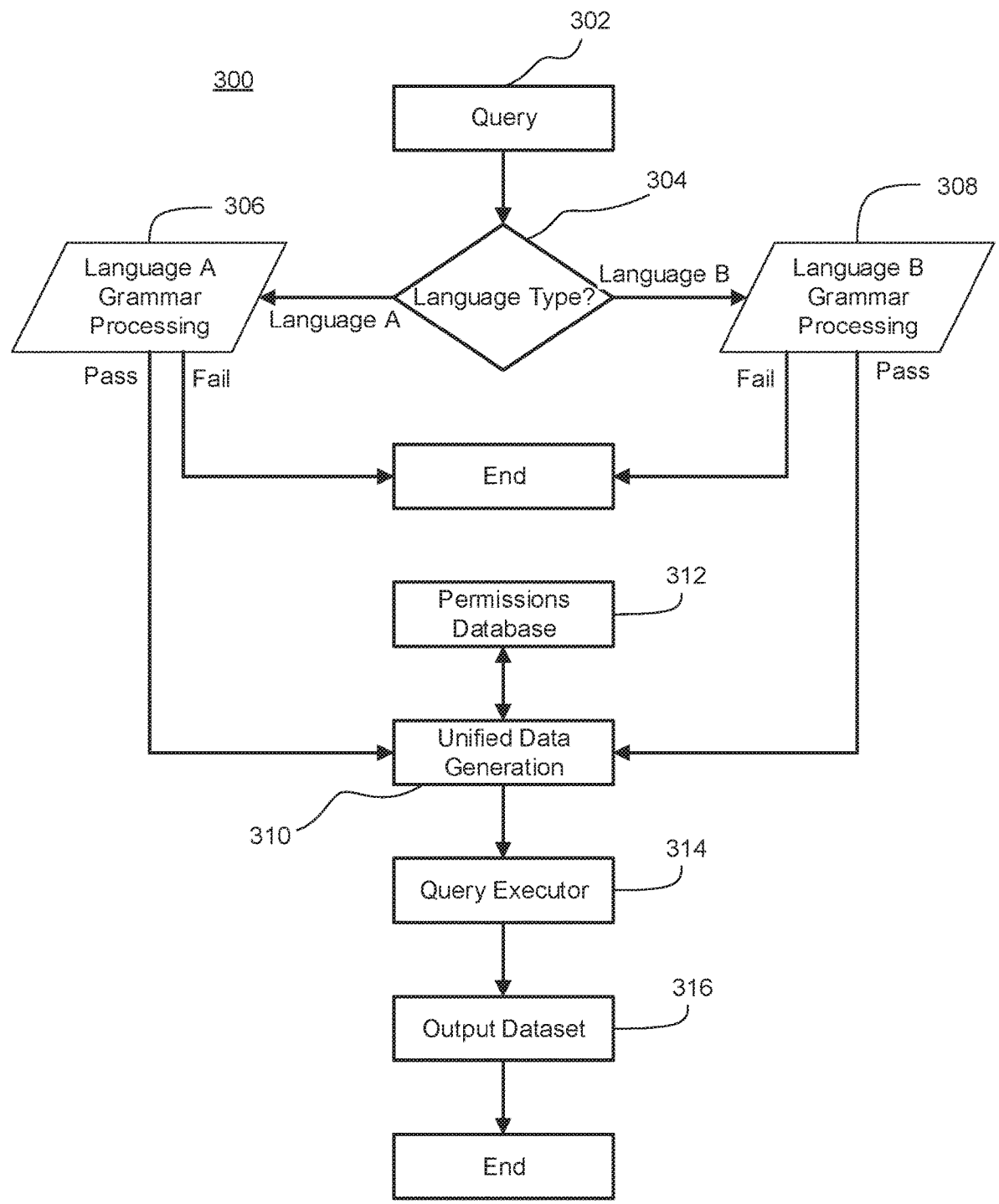
Figure 4:
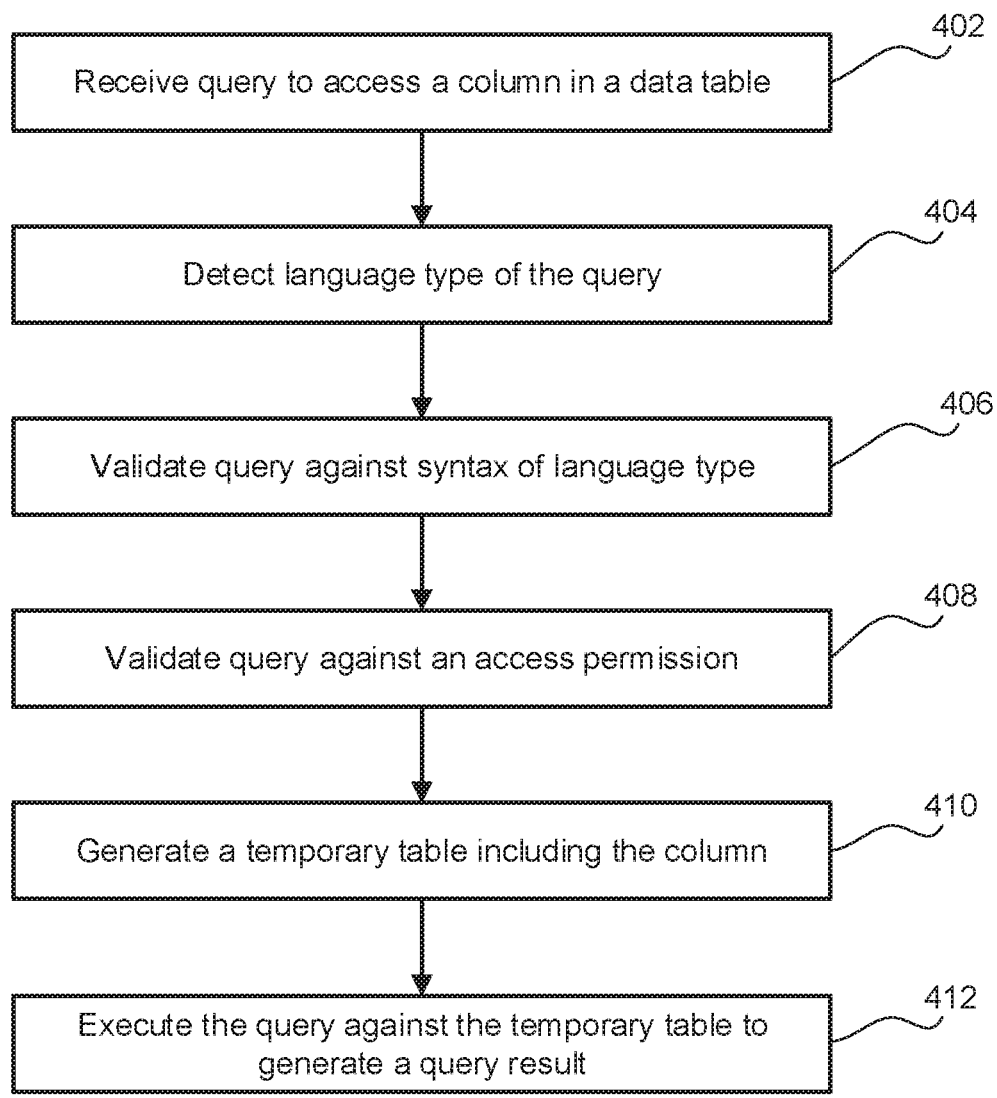

FIG. 3 illustrates an exemplary flow chart for identifying a query type and applying access controls to an output dataset by generating a temporary table that applies the access controls, in accordance with various embodiments; and FIG. 4 illustrates an exemplary process for applying fine grained access controls to an output dataset by querying a temporary table that applies the access controls, in accordance with various embodiments.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big data storage formats containing millions of records (i.e., rows) and numerous variables (i.e., columns) for each record.

Phrases and terms similar to "internal data" and "personally identifying information," (PII) may include any identifying or sensitive data related to an individual. For example, data that a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

The present disclosure provides a system, method, and computer program product for providing access control in a big data environment with changing table structures. Sensitive data may come in the form of internal data and/or PII data that identifies an individual. Access control may be monitored and/or controlled at a column level, a row level, a file level, and/or a table level, based on user privileges. To achieve access control, the system may limit access using an access permission database to store and retrieve user permissions. In response to columns and/or rows being added to big data files, the access permissions may be updated according to the content of the columns and the rows in the files.

Figure 1:
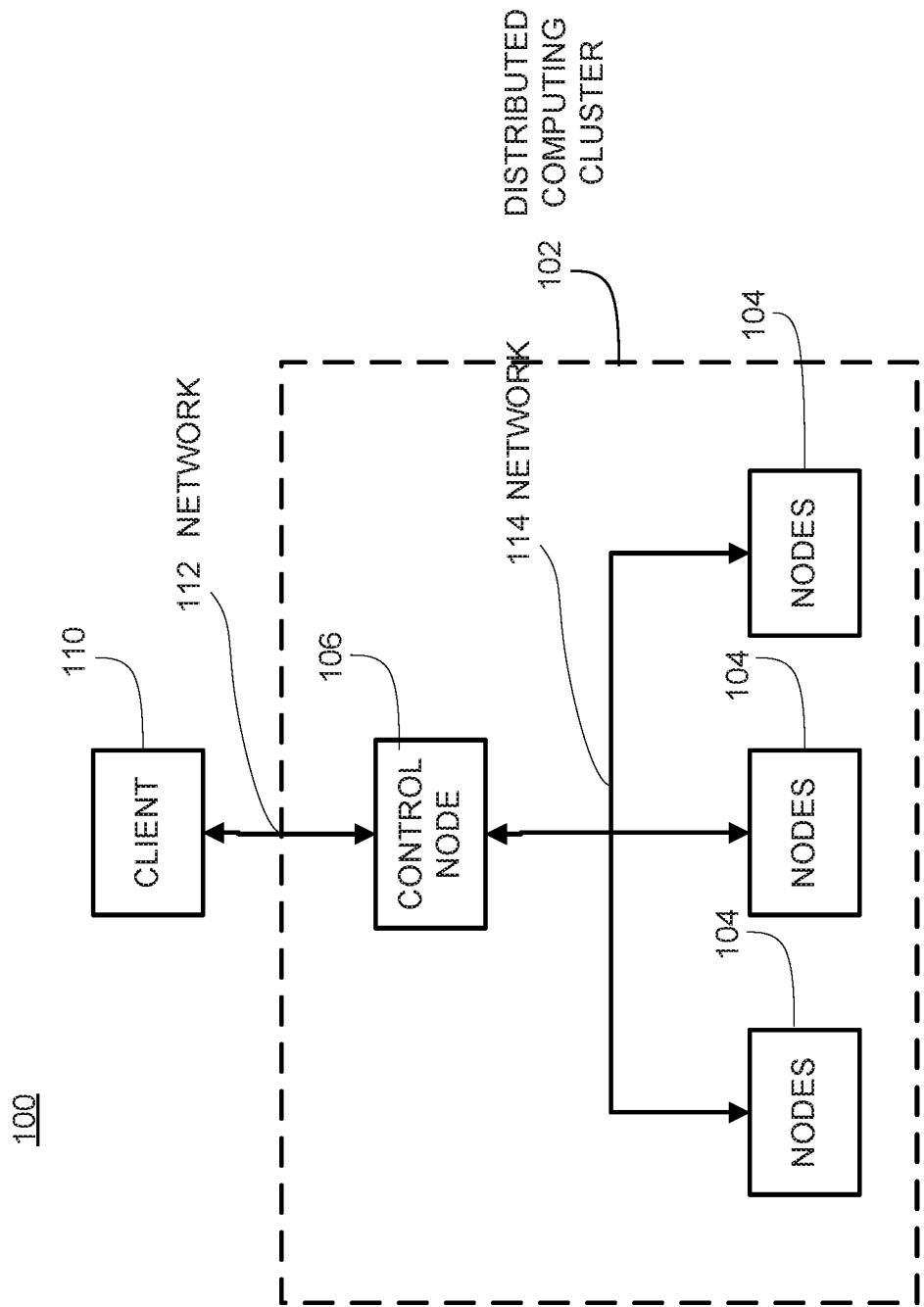
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 may comprise a distributed computing cluster 102 configured for parallel processing and/or storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and/or store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones, tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, DFS 100 may process hundreds of thousands of records from a single data source. DFS 100 may also ingest data from hundreds of data sources. Nodes 104 may process the data in parallel to expedite the processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104. Each node 104 may process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 2:
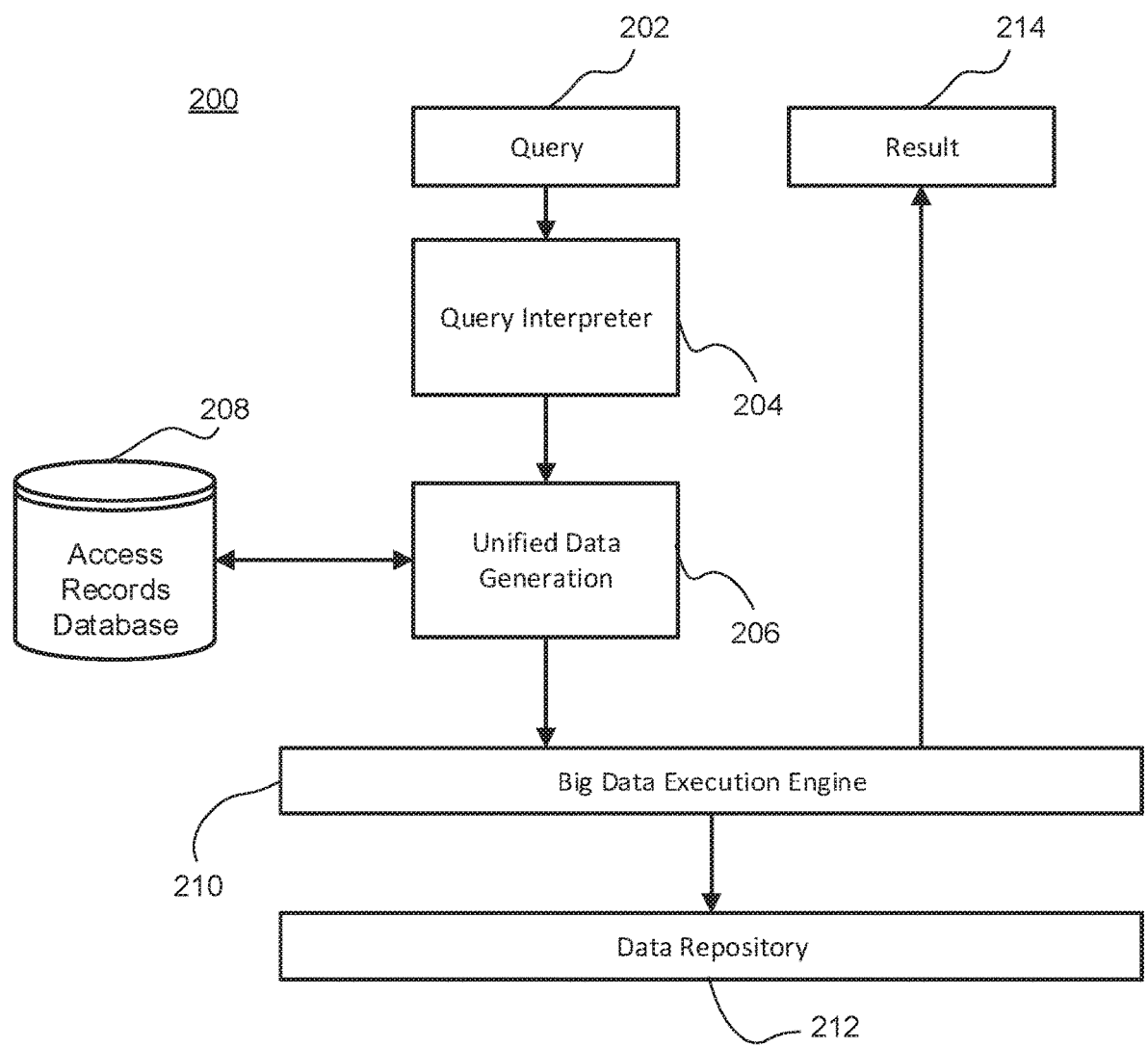
FIG. 2 illustrates exemplary system architecture for enforcing access control in a big data environment supporting multiple storage formats, in accordance with various embodiments.

With reference to FIG. 2, an exemplary architecture of system 200 configured to run on DFS 100 is shown, in accordance with various embodiments. System 200 accepts query 202 from a user or an application. Query 202 may be written to retrieve and/or write data to an underlying big data storage format using a user preferred query language. The user submitting query 202 may not know what format the underlying data is stored in. Query interpreter 204 may be used to convert query 202 from the user preferred query language to a language supported by unified data generation (UDG) 206

In various embodiments, query 202 may be written in any supported query language. Query 202 may be written to interface with a data warehouse such as a Hive® installation. Query 202 may be written to interface with an analysis runtime environment and an interface syntax similar to those offered in the Pig platform (i.e., written in Pig Latin) as described and made available by the Apache Software Foundation at https://pig.apache.org/. Query 202 may be written in a query language configured to interface with a non-relational database such as an HBase™ storage format, for example, as described and made available by the Apache Software Foundation at http://hbase.apache.org/. Query 202 may also be written in a syntax configured to interface with, for example, a Solr® search platform as described and made available by the Apache Software Foundation at http://lucene.apache.org/solr/. Query 202 may thus be written in any supported big data language, such as, for example, Hive®, Pig, Spark®, and Hadoop® MapReduce and translated to a language for interacting with the UDG 206 to generate a temporary table for big data execution engine 210 to execute a query.

In various embodiments, system 200 may pass query to query interpreter 204. Query interpreter 204 may determine which language a query is written in. For example, query interpreter 204 may be configured to identify a HIVE® query from a Pig query based on the syntax and structure of the query. Query interpreter 204 may also validate the query syntax and structure to enforce compliance with language rules for supported languages. Query interpreter 204 may signal that a syntax error is detected in query 202 or that query 202 does not conform to a supported query language in response to detected errors. Query interpreter 204 may translate the query into a format compatible with UDG 206.

In various embodiments, UDG 206 may generate a result set for the query that is compliant with access permissions. In that regard, UDG 206 may retrieve access permissions from access records database (ARD) 208 for each user ID that submits a query 202. ARD 208 may be a repository for access permissions. The access permissions stored in ARD 208 may indicate row-level, column-level, table-level, file-level, and/or data-type-level permissions for a user based on, for example, user ID. User permissions for access to sensitive data, such as PII, may be populated based on user role, business group, user access demands, etc. and may be matched to query 202 based on the user ID of a user submitting query 202. UDG 206 may also log user queries with a timestamp, a user, the query syntax, and/or other relevant query details for audit purposes.

For example, ARD 208 may store column level permissions that indicate whether or not the user submitting a query is permitted to view data contained within each column. In response to query 202, UDG 206 may retrieve the relevant permissions to generate a dataset that enforces access control limitations of a user relative to data responsive to query 202. Access records database 208 may be stored in various formats. For example, access records database may include a relational database, a flat file, a big data format, a collection of UNIX permissions, and/or any other suitable permissions storage format. ARD 208 may also contain clear text permissions for various columns and/or data types that indicate whether a user has access to clear text data or is limited to scrambled text data. If the user does not have clear text access to a requested column of query 202, the result 214 returned in response to the query, may contain scrambled text in the requested column. Scrambled text may be scrambled in a deterministic manner so that the scrambled values may support table joins based on the scrambled values. Some values, such as gender, which do not support join operations, may simply be returned as restricted without providing a deterministic scramble value. UDG 206 may also determine that a user does not have access to the underlying table that stores data responsive to query 202 and, as a result, notify the user that the query may not be executed. UDG 206 may also identify row-level permissions and/or Open Network Confidentiality Operating Principles (ONCOP) and limit access to data based on the permissions by generating a temporary table that excludes restricted data, as discussed in greater detail below.

In various embodiments, UDG 206 may further track changes in underlying data schemas by tagging data with metadata that identifies a schema version number. For example, UDG 206 may tag an initial schema having 10 columns as version 1 and a later schema having 15 columns as version 2. UDG 206 may use the version numbers to track columns that have been added and/or deleted in various versions of the underlying big data schema. UDG 206 may generate a unified temporary table or dataset that spans a schema version, in response to the user query, and detects deleted columns. Deleted columns may be replaced with null values and/or populated with data from earlier schema versions. In that regard, the temporary table generated by UDG 206 may provide a unified table of data across varying schema versions by detecting the schema of file at run time and reading it to support deletion, addition, and/or shuffling of columns.

In various embodiments, the results of the query may be generated using batch processing on DFS 100. The big data execution engine 210 may retrieve columns identified in the query from data repository 212 using version numbers and column identifiers. Data repository 212 may store data in flat files or other big data storage formats. The results for a query may be generated using, for example, a Hadoop® MapReduce framework distributed with the Hadoop® HDFS as specified by the Apache Software Foundation at http://hadoop.apache.org/docs/. The data may be used by UDG 206 to generate the temporary table, and the query 202 may be executed against the temporary table to generate result 214.

With reference to FIG. 3, a flow 300 for evaluating a query and generating an output dataset 316 is shown, in accordance with various embodiments. Query 302 may be analyzed to determine a language type of the query. The language type 304 may be one of two or more languages supported by the system. For example, language A may be HIVE® and language B may be Pig Latin. In response to detecting language A, language A grammar processing 306 may be used to process query 302. In response to detecting language B, language B grammar processing 308 may be used to process query 302. In that regard, a user may submit a query in any supported language and the system may detect the language and/or apply language processing that matches the language type. If the language processing fails, for example, because the syntax or contents of query 302 are incorrect, the query 302 may not be run and the query analysis ends. If language processing passes, the processed query is passed to UDG 310. UDG 310 may operate in the same manner as UDG 206 of FIG. 2.

In various embodiments, UDG 310 may thus apply user permissions from permissions database 312 and detect version numbers for generating a temporary dataset customized based on the user submitting the query. UDG 206 may retrieve data from the underlying data storage to generate a temporary table and pass the temporary table to query executor 314. The temporary table may be formatted to support the language type 304 of query 302. Query executor 314 may execute query 302 against the temporary table in the native environment of the query language or in a simulated execution environment. For example, query executor 314 may run a Pig Latin query using the pig execution environment. Query executor may compile the results into an output dataset 316. Output dataset may have permissions applied according to the user submitting query 302 such that access permissions are enforced. The temporary dataset may be deleted in response to query executor 314 completing the query. In that regard, the duplicative data of the temporary dataset may be deleted to conserve storage space.

With reference to FIG. 4, a process 400 is shown for managing access permissions in a changing big data environment supporting multiple big data query languages (e.g., running on DFS 100). Process 400 may include receiving a query configured to access a column in a data table stored in a big data format (Block 402). The query may be in various languages having various syntaxes, as disclosed above. A language type of the query may be detected (Block 404). The language type may be detected by identifying key words and query structure and matching the key words and query structure to key words and query structure of a known query language.

In various embodiments, the query may be validated against a syntax of the language type (Block 406). Validating the query against a syntax may include identifying query structure and key words present in the query and detecting whether or not the query is valid in the identified language type. The system may also validate access permissions for data in the data table with the access permission being stored in a permissions database, such as ARD 208 of FIG. 2 (Block 408). The access permission may be access permission for a user to access data at a table level, a row level, a column level, and/or a data-type level. The access permissions may thus be applied to enforce access limitations and limit dissemination of protected data.

In various embodiments, a temporary table may be generated that includes the column identified in the query (Block 410). The temporary table may be generated in a format that supports the query language type. In that regard, the system may support a query language, despite the underlying persistent data storage format not supporting the query language, by formatting the temporary table. The query may be executed against the temporary table to generate a query result (Block 412). The temporary table may be deleted to conserve disc storage space.

In various embodiments, the system may retrieve PII permissions from the permissions database. The PII permission may indicate that a user executing the query has masked PII permissions, restricted permissions, and/or clear text PII permissions. The data included in the temporary table may be formatted in clear text or scrambled to conform to the PII permissions. PII data included in the query result may thus be masked in response to the query result containing PII.

In various embodiments, row-level access permissions may be retrieved from the permissions database for the user submitting the query. The row-level access permission may indicate that rows for which the user does not have access rights may be filtered from the temporary table. UDG 206 may run a process to limit the data appearing in the temporary table to data matching the user permissions. The result set generated by running the query against the temporary table will thus not contain restricted rows for the user.

In various embodiments, the UDG 206 may check that raw data ingestion is complete and/or not running in order to maintain atomicity, consistency, isolation, and durability (ACID) of the data set. Atomicity means that a data storage system considers the query as a whole so that the query will be completely executed or not at all. Consistency means that a data storage system ensured that only valid data following the rules of the data storage system are written. Isolation means that individual queries are executed completely without interference from other queries or data storage modifications. Durability means after a query has been executed and committed it will not be impacted by environmental failures such as power loss. UDG 206 may also determine whether a column identified in a query is unavailable in source data and populate the column in the temporary table with null values in response to the data being deleted.

The systems and methods herein provide a unified data generation tool for applying permissions, supporting data modification, and supporting preferred query languages. The system may generate a temporary table that is in compliance with user access permissions. The temporary table may also contain columns from various schema versions that may have been added and/or deleted over time. The query may run against the temporary table to ensure the results are in compliance with access rights and contain complete data that may be stored across varying schema versions.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   detecting, by a computing device, a first language type of a query configured to access a column in a data table, wherein the query is requested by a user;
   determining, by the computing device, that the first language type does not conform with a data storage format of the data table;
   converting, by the computing device, the query from the first language type to a second language type that conforms with the data storage format of the data table;
   after converting the query to the second language type, generating, by the computing device, a temporary table including the column and excluding restricted data for which the user does not have an access permission by formatting the temporary table to support the second language type and be compliant with the access permission;
   executing, by the computing device, the query against the temporary table to generate a query result; and
   deleting, by the computing device, the temporary table after execution of the query against the temporary table.

2. The method of claim 1, further comprising:
   populating, by the computing device and in a permissions database, personally identifying information (PII) permissions based on a user role, a business group, and a user access demands; and
   retrieving, by the computing device, the PII permissions from the permissions database, wherein the PII permissions indicate that a user executing the query has masked the PII permissions.

3. The method of claim 2, further comprising masking, by the computing device, PII data included in the query result in response to the query result containing PII.

4. The method of claim 1, further comprising retrieving, by the computing device, a row-level permission for a user submitting the query from a permissions database.

5. The method of claim 4, wherein the temporary table excludes a row from the data table in response to the row-level permission.

6. The method of claim 1, further comprising checking, by the computing device, that raw data ingestion is complete to maintain atomicity, consistency, isolation, and durability (ACID).

7. The method of claim 1, further comprising:
   determining, by the computing device, the column is unavailable in source data; and
   populating, by the computing device, the column in the temporary table with null values.

8. The method of claim 1, further comprising adding, by the computing device, at least one of a row or the column to the data table.

9. The method of claim 1, further comprising updating, by the computing device, the access permission based on content of at least one of a row or the column added to the data table.

10. The method of claim 1, further comprising receiving, by the computing device, the query configured to access the column in the data table.

11. The method of claim 1, wherein the converting uses a query interpreter.

12. The method of claim 1, wherein the second language type is supported by a unified data generation.

13. The method of claim 1, wherein the generating the query result uses a unified data generation.

14. The method of claim 1, wherein the access permission includes at least one of row-level permissions, column-level permissions, table-level permissions, file-level permissions or data-type-level permissions.

15. The method of claim 1, further comprising validating, by the computing device, the access permission for data in the data table, wherein the access permission is stored in a permissions database.

16. The method of claim 1, wherein the data table comprises flat files.

17. A computer-based system, comprising:
  a processor; and
  a tangible, non-transitory memory configured to communicate with the processor, the tangible, non-transitory memory having instructions stored thereon that, in response to execution by the processor, the processor to perform operations comprising:
    detecting, by the processor, a first language type of a query configured to access a column in a data table, wherein the query is requested by a user;
    determining, by the processor, that the first language type does not conform with a data storage format of the data table;
    converting, by the processor, the query from the first language type to a second language type that conforms with the data storage format of the data table;
    after converting the query to the second language type, generating, by the processor, a temporary table including the column and excluding restricted data for which the user does not have an access permission by formatting the temporary table to support the second language type and be compliant with the access permission;
    executing, by the processor, the query against the temporary table to generate a query result; and
    deleting, by the processor, the temporary table after execution of the query against the temporary table.

18. The system of claim 17, further comprising updating, by the processor, the access permission based on content of at least one of a row or the column added to the data table.

19. The system of claim 17, further comprising receiving, by the processor, the query configured to access the column in the data table.

20. An article of manufacture including a non-transitory, tangible computer readable storage medium having instructions stored thereon that, in response to execution by a processor, cause the processor to perform operations comprising:
  detecting, by the processor, a first language type of a query configured to access a column in a data table, wherein the query is requested by a user;
  determining, by the processor, that the first language type does not conform with a data storage format of the data table;
  converting, by the processor, the query from the first language type to a second language type that conforms with the data storage format of the data table;
  after converting the query to the second language type, generating, by the processor, a temporary table including the column and excluding restricted data for which the user does not have an access permission by formatting the temporary table to support the second language type and be compliant with the access permission;
  executing, by the processor, the query against the temporary table to generate a query result; and
  deleting, by the processor, the temporary table after execution of the query against the temporary table.

* * * * *